(12) United States Patent
Caldeira et al.

(10) Patent No.: US 12,206,095 B2
(45) Date of Patent: Jan. 21, 2025

(54) ELECTRODE FOR RECHARGEABLE ENERGY STORAGE DEVICE

(71) Applicants: EASYL, Bonneville (FR); CENTRE NATIONAL DE LA RECHERCHE SCIENTIFIQUE, Paris (FR)

(72) Inventors: Vincent Caldeira, Grenoble (FR); Julien Thiel, Arbusigny (FR); Marian Chatenet, Meylan (FR); Laëtitia Dubau, Grenoble (FR); François Lacoste, Neuilly-sur-Seine (FR)

(73) Assignees: EASYL ZINC, Sainte-Hélène-du-Lac (FR); CENTRE NATIONAL DE LA RECHERCHE, Paris (FR)

( * ) Notice: Subject to any disclaimer, the term of this patent is extended or adjusted under 35 U.S.C. 154(b) by 687 days.

(21) Appl. No.: 17/434,948

(22) PCT Filed: Feb. 27, 2020

(86) PCT No.: PCT/FR2020/050395
§ 371 (c)(1),
(2) Date: Aug. 30, 2021

(87) PCT Pub. No.: WO2020/178509
PCT Pub. Date: Sep. 10, 2020

(65) Prior Publication Data
US 2022/0149356 A1    May 12, 2022

(30) Foreign Application Priority Data

Mar. 1, 2019  (FR) ...................... 1902150

(51) Int. Cl.
*H01M 4/36* (2006.01)
*H01M 4/24* (2006.01)
*H01M 4/48* (2010.01)
(Continued)

(52) U.S. Cl.
CPC ............. *H01M 4/366* (2013.01); *H01M 4/24* (2013.01); *H01M 4/244* (2013.01); *H01M 4/48* (2013.01);
(Continued)

(58) Field of Classification Search
CPC .......... H01M 4/36; H01M 4/366; H01M 4/24; H01M 50/417; H01M 50/44
See application file for complete search history.

(56) References Cited

U.S. PATENT DOCUMENTS

| 9,692,056 B1 | 6/2017 | Liu et al. |
| 2003/0146414 A1* | 8/2003 | Ndzebet ................ H01M 12/06 252/500 |

(Continued)

FOREIGN PATENT DOCUMENTS

CN    103367842 A    10/2013

OTHER PUBLICATIONS

International Search Report for PCT/FR2020/050395, mailed Jul. 21, 2020, 6 pages.
(Continued)

*Primary Examiner* — Kenneth J Douyette
(74) *Attorney, Agent, or Firm* — NIXON & VANDERHYE (57) ABSTRACT

Disclosed is an electrode for a rechargeable energy storage device, including several inner layers interposed between two outer layers, the inner layers including several electrode material layers ME composed of at least one electrode active material and several porous current collector layers CC composed of electrically-conductive material(s) whose electronic conductivity is greater than or equal to 102 S·cm-1, the layers of electrode material ME and current collector CC being alternated. The outer layers do not consist of the porous current collector layers CC. Additionally, the elec-
(Continued)

trode has a total thickness ranging from strictly more than 4 mm, preferably ranging from strictly more than 4 mm to 10 mm, in particular ranging from strictly more than 4 mm to 8 mm.

20 Claims, 2 Drawing Sheets

(51) Int. Cl.
    *H01M 4/62*     (2006.01)
    *H01M 4/66*     (2006.01)
    *H01M 4/72*     (2006.01)
    *H01M 10/30*     (2006.01)
    *H01M 50/417*     (2021.01)
    *H01M 50/44*     (2021.01)
    *H01M 4/02*     (2006.01)

(52) U.S. Cl.
    CPC ........... *H01M 4/622* (2013.01); *H01M 4/661* (2013.01); *H01M 4/72* (2013.01); *H01M 10/30* (2013.01); *H01M 50/417* (2021.01); *H01M 50/44* (2021.01); *H01M 2004/021* (2013.01)

(56) References Cited

U.S. PATENT DOCUMENTS

| | | | |
|---|---|---|---|
| 2011/0091776 A1* | 4/2011 | Rubino | H01M 10/0431 429/231.5 |
| 2011/0123866 A1 | 5/2011 | Pan et al. | |
| 2013/0260265 A1 | 10/2013 | Shimizu et al. | |
| 2014/0093769 A1 | 4/2014 | Busnaina et al. | |
| 2015/0064556 A1* | 3/2015 | Lee | H01M 4/62 429/231.5 |
| 2016/0093875 A1* | 3/2016 | Teraoka | H01M 10/052 429/231.95 |
| 2016/0285080 A1* | 9/2016 | Yokoyama | H01M 4/502 |
| 2017/0098856 A1 | 4/2017 | Zhamu et al. | |

OTHER PUBLICATIONS

Written Opinion of the ISA for PCT/FR2020/050395, mailed Jul. 21, 2020, 7 pages.

Office Action issued in Chinese Patent Application No. 202080016485.7 dated Jun. 1, 2023.

* cited by examiner

ELECTRODE FOR RECHARGEABLE ENERGY STORAGE DEVICE

BACKGROUND OF THE INVENTION

Field of the Invention

The present invention relates to the field of energy storage.

In particular, the present invention relates to an electrode for a rechargeable energy storage device, such as a battery (electrochemical accumulator), comprising several electrode material layers ("ME") and several porous current collector layers ("CC") disposed in a specific way, the electrode being characterised in that it has a relatively large total thickness (in the range of strictly more than 4 mm to 10 mm).

The present invention also relates to an energy storage device comprising said electrode, as well as to the uses of said electrode.

Description of the Related Art

Electrochemical batteries have become essential constituents in stationary and mobile applications, such as mobile electronic devices, electrical or mechanical appliances. They are also widely studied for use in electric vehicles, as well as in the energy storage field. The technologies and variants are numerous (Lead-Acid, Cadmium-Nickel, Metal-Hydride-Nickel, Lithium, Sodium-Sulfur, Zinc-Air, Zinc-Nickel, etc.).

Current technological researches aim to develop batteries that are more environment-friendly, more economical and further comprising abundant raw materials, such as those comprising a negative electrode made of zinc, such as zinc-air batteries (hereinafter zinc-air) or zinc-nickel batteries.

In particular, a metal-air, such as zinc-air, rechargeable battery is a system consisting (in discharge) of a metallic anode, a cathode reacting with the oxygen of air and an electrolyte. These batteries have a configuration similar to conventional batteries with regards to the negative electrode since the latter is made of a metal which serves as a negative active material. On the positive electrode side, the metal-air batteries are similar to fuel cells since these consist of a porous structure containing a material enabling the oxygen of air to be used as a positive active material by an electro-catalytic reaction.

By "capacity of the battery or of the accumulator", it should be understood the amount of electrical energy that it is capable of rendering after having received a full charging, for a given discharge current regime, defined cut-off voltage and temperature. Usually, it is expressed in ampere-hours (Ah).

In addition, in the particular case of metal-air batteries consisting of two positive electrodes, one intended for charging and the other intended for discharging, the system is limited by geometric technological constraints, namely the two positive electrodes are disposed on either side of the unique negative electrode. In this case, the only means for increasing the capacity of the battery is to increase the amount of active material present in the negative electrode and therefore its volume. Nonetheless, those skilled in the art know that an increase in the amount of active material is a factor that limits the electrochemical performances because of various physicochemical phenomena, such as the inner accessibility of the electrode by the electrolyte (mentioned hereinafter as "impregnation").

In the state of the art, mention may be made of the document US2017/0098856. This document describes a method for forming a battery comprising at least: a positive electrode, a negative electrode, electrolytes and a porous separation layer. The object of this document is to provide a lithium battery having in particular a large electrode thickness. The electrode thickness may range up to 1 mm and is preferably located between 10 and 1000 µm, in particular between 100 and 800 µm and typically between 200 and 600 µm.

Mention may also be made of the document U.S. Pat. No. 9,692,056 which describes electrodes for batteries, generally based on lithium. This document also describes current collectors for such electrodes. The document US 2011/0123866 also describes electrodes adapted for lithium batteries. In particular, an electrode according to this invention may comprise electrode material layers interposed with layers comprising a high conductive material content. These layers with a high conductive material content do not correspond to current collector layers.

The document US 2014/0093769 describes an electrode for a rechargeable battery comprising:
an electrically-conductive substrate; and
a stack of active material layers comprising in particular a layer based on carbon nanotubes.

Although a large number of rechargeable batteries are currently under development, there is a need in the state of the art for batteries and in particular for so-called more environment-friendly batteries, namely advantageously comprising no or not consisting of lithium or lead.

Thus, there is a need in the state of the art for rechargeable batteries that are more environment-friendly, such as batteries whose negative electrode is zinc-based such as zinc-air or zinc-nickel batteries having a greater capacity.

The is also the need in the state of the art for such batteries having a greater capacity, while preferably having a better inner conductivity and a good mechanical strength, and possibly also preferably a great cyclability, namely a longer cycling life span (that is to say the number of times where the battery could render the same energy level after each new charging).

Thus, an object of the present invention is to provide a new electrode for a rechargeable energy storage device that meets, at least partially, the needs of the state of the art.

Indeed, an object of the present invention is to provide an electrode for a rechargeable energy storage device, such as a battery, allowing increasing its capacity, and advantageously obtaining a good mechanical strength, and possibly a good cycling life span, and that being so while taking into account the constraints inherent to the electrode (namely, its physicochemical properties, such as matter transfer, porosity, conductivity, electronic percolation or mechanical strength).

SUMMARY OF THE INVENTION

The invention provides an electrode for a rechargeable energy storage device such as a battery whose negative electrode is zinc-based such as a zinc-air or zinc-nickel battery, comprising several inner layers interposed between two outer layers, said inner layers comprising several electrode material layers ME composed of at least one electrode active material and several porous current collector layers CC composed of electrically-conductive material(s) whose electronic conductivity is greater than or equal to $10^2$ S·cm$^{-1}$, preferably $10^4$ S·cm$^{-1}$, said layers of electrode material ME and current collector CC being alternated, characterised in that said outer layers do not consist of said porous current collector layers CC, and in that said electrode has a total thickness ranging from strictly more than 4 mm, preferably ranging from strictly more than 4 mm to 10 mm, in particular ranging from strictly more than 4 mm to 8 mm.

According to the invention, an electrode material layer ME is distinct from a porous current collector layer CC.

In particular, a porous current collector layer CC has an electronic conductivity higher than that of an electrode material layer ME.

In the context of the present invention, by "outer layer", it should be understood a layer that does not form an inner layer of the electrode and which is the layer at the surface of the electrode (in contact with the electrolyte).

According to a feature of the invention, the outer skins do not consist of said porous current collector layers CC. Indeed, the outer layers are intended to be in direct contact with the electrolyte of the rechargeable energy storage device and therefore these should preferably be compatible with this electrolyte. As example, in the case of rechargeable energy storage devices with an alkaline electrolyte (Zinc-Air and Zinc-Nickel), this electrolyte contains zinc ions in the solution. Yet, the electrolyte is incompatible with the electrically-conductive materials composing the porous current collector layers. Thus, these are advantageously covered with an active material (electrode material layer ME) in order not to undergo a preferential electroplating with zinc originating from the electrolyte and therefore, consequently, not form a dendrite in an uncontrollable manner.

Preferably, the electrode has a total thickness ranging from strictly more than 4 mm to 6 mm.

Thus, the present invention has the advantage of allowing reaching very large electrode thicknesses, while preserving good physicochemical and electrochemical properties.

According to the invention, "a total thickness ranging from strictly more than 4 mm to 10 mm" comprises the following values or any interval comprised between any one of these values: 4.5; 5; 5.5; 6; 6.5; 7; 7.5; 8; 8.5; 9; 9.5 and 10 mm.

Advantageously, the porous current collector layers CC are identical or different and consist of electrically-conductive material layers.

In particular, the electrode is characterised in that at least one portion or each (all) of the porous current collector layers CC is in the form of a grid, a perforated sheet, a felt, a mesh, a fabric, or a foam.

According to a feature of the invention, the porous current collector layers CC, whether identical or different, consist of layers of metallic conductive material further comprising a metal M selected from aluminium, copper, nickel, zinc, tin and one of the mixtures thereof.

Preferably, each of the electrode material layers ME further comprises a polymer binder and optionally an electronic conductivity-imparting agent or additives.

According to another feature of the invention, each of the electrode material layers ME has a thickness ranging from 50 µm to 1 mm, preferably ranging from 100 µm to 500 µm.

According to a first variant of the invention, said electrode is in the form of an assembly of successive layers where each of the two outer layers of the electrode is an electrode material layer ME, having the following structure:

ME-[CC-ME]$_n$ou[ME-CC-ME]$_n$ wherein ME is an electrode material layer, CC is a porous current collector layer, "n" is a repeat pattern which is comprised between 3≤n≤200, preferably between 3≤n≤100, and typically between 3≤n≤20.

According to the invention, the feature "2≤n≤200" comprises the following values or any interval comprised between any one of these values: 2; 3; 4; 5; 6; 7; 8; 9; 10; 11; 12; 13; 14; 15; 16; 17; 18; 19; 20; 21; 25; 30; 35; 40; 45; 50; 55; 60; 65; 70; 75; 80; 85; 90; 95; 100; 105; 110; 115; 120; 125; 130; 135; 140; 145; 150; 155; 160; 165; 170; 175; 180; 185; 190; 195; 200.

In the context of the invention, "n" is in particular a natural integer number.

According to a second variant of the invention, said electrode is in the form of an assembly of successive layers where at least one of said inner layers is an impregnation layer MI comprising or consisting of an inert porous material (namely not electrically-conductive), provided that when the electrode comprises two or more impregnation layers MI, these are at least spaced apart by 100 µm to 4 mm, preferably by 300 µm to 3 mm, in particular by 500 µm to 2 mm and ideally by 1 mm. Preferably, according to this variant, each of the two outer layers of the electrode is an electrode material layer ME and said electrode is in the form of an assembly of successive layers having the following structure:

ME-CC-[ME-MI-ME-CC]$_n$-ME wherein ME, CC, n are as defined hereinabove, namely ME is an electrode material layer, CC is a porous current collector layer, MI is an impregnation layer, "n" is as defined hereinabove, namely a repeat pattern which is comprised between 2≤n≤200, preferably between 2≤n≤100, and typically between 2≤n≤20.

According to a third variant of the invention, at least one of the two outer layers, preferably both layers, consist(s) of a mechanical holding and separation layer MMS comprising at least one inert material (i.e.: not electrically-conductive) capable of or configured to allow the circulation of the electrolyte and the ions thereof.

The layer MMS may comprise, or consist of, at least one material that could be identical to the inert porous material of the impregnation layer MI, namely comprise, or consist of, a mesh of polypropylene (PP), polytetrafluoroethylene (PTFE) or any other equivalent porous material.

According to this variant of the invention, said electrode is in the form of an assembly of successive layers having the following structure:

MMS-ME-[CC-ME]$_n$-MMS or

MMS-ME-CC-[ME-MI-ME-CC]$_n$-ME-MMS wherein ME, CC, MI, MMS and n are as defined hereinabove, namely ME is an electrode material layer, CC is a porous current collector layer, MI is an impregnation layer, MMS is a mechanical holding and separation layer, "n" is a repeat pattern which is comprised between 2≤n≤200, preferably between 2≤n≤100, and typically between 2≤n≤20.

Preferably, said electrode is a positive or negative electrode.

Advantageously, the electrode is a zinc-based negative electrode.

The present invention also relates to an energy storage recharging device comprising at least: a positive electrode, a negative electrode and an electrolyte, said device being characterised in that at least the positive electrode or the negative electrode, preferably the negative electrode, is an electrode as defined hereinabove.

In general, the recharging device is an alkaline accumulator selected from a battery whose negative electrode is zinc-based, such as a zinc-air battery and a zinc-nickel battery. Preferably, the battery is a zinc-air battery.

Finally, the present invention also relates to the use of an electrode as defined hereinabove, to improve the capacity of a rechargeable energy storage device.

Of course, the aforementioned different features, variants and embodiments of the invention, may be associated together according to various combinations to the extent that these are not incompatible or do not exclude each other.

In the remainder of the description, unless specified otherwise, the indication of an interval of values "from X to Y" or "between X and Y", in the present invention, should be understood as including the values X and Y and the expression "strictly higher than Z" in the context of the invention should be understood as not including the limit Z.

BRIEF DESCRIPTION OF THE DRAWINGS

In addition, various other features of the invention will come out from the appended description made with reference to the drawings which illustrate non-limiting embodiments of the invention and where.

It should be understood that in these figures, the structural and/or functional elements that are common to the different variants may bear the same references.

DESCRIPTION OF THE PREFERRED EMBODIMENTS

The Applicant has sought to develop a new electrode having an improved capacity in comparison with the electrodes of the prior art and that being so while taking into account the technological constraints related in particular to the physicochemical properties of its materials forming the electrode and while taking into account the problems of inner resistance that might prevail within the latter (material transfer difficulty) and which could lower its performances.

To this end, an object of the present invention is an electrode for a rechargeable energy storage device, comprising several inner layers interposed between two outer layers, said inner layers comprising several electrode material layers ME composed of at least one electrode active material and several porous current collector layers CC composed of electrically-conductive material(s) whose electronic conductivity is greater than or equal to $10^2$ S·cm$^{-1}$, said layers of electrode material ME and current collector CC being alternated, characterised in that said outer layers do not consist of said porous current collector layers CC, and in that said electrode has a total thickness strictly more than 4 mm, preferably ranging from strictly more than 4 mm to 10 mm, in particular ranging from strictly more than 4 mm to 8 mm.

In general, the total thickness of the electrode varies from strictly more than 4 mm to 6 mm.

Indeed, the Applicant has developed a new electrode featuring a great storage capacity. Indeed, thanks to its characteristics and in particular its relatively large thickness, the electrode according to the invention features an excellent capacity.

In particular, in the case where the electrode according to the invention is used for example as a negative electrode in a metal-air, such as a zinc-air, battery wherein the positive electrode has a fixed dimension (height×width), the relatively large thickness of the electrode according to the invention leads to a better inner conductivity. Indeed, the electrode according to the invention has a large amount of metal and a large number of conductors allowing increasing the collection and its energy density.

Also, thanks to the use of several porous current collector layers distributed in the electrode combined with the use of electrode material layers ME generally further forming the two outer layers of the electrode, a multiple current collection network is created. In particular, the inner current fields are improved, thereby allowing for a better distribution of the current within the electrode and a more homogeneous redistribution of the metal (such as zinc). Moreover, the reversibility of the electrode is improved.

Furthermore, the inventors of the present application have surprisingly discovered that the electrode structure as defined hereinabove is particularly suitable when the conductivity of the active material in the electrode material i slow (i.e. <$10^{-1}$ S·cm$^{-1}$) and/or that the thickness of the electrode within the device is not a limiting factor (for example, stationary applications). It is also suitable for devices wherein the matter and charges transfer in the electrolyte is not limiting (for example supercapacitors).

As mentioned hereinabove, the electrode according to the invention comprises in particular distinct electrode material ME and current collector CC layers which are alternated. These CC and ME layers will be described hereinafter.

In particular, the porous current collector layers CC according to the invention, in general three in number, are intended to or configured so as to ensure the electrical connection of the electrode with the external circuit. Indeed, they are intended to transfer the electrons produced/received by the electrode material layers ME out of the system of the rechargeable energy storage device (battery). For this purpose, in general, at least one portion or each (all) of the porous current collector layers CC may be in the form of a grid, a perforated sheet, a felt, a mesh, a fabric, or a foam, preferably a foam with an open porosity.

Each of the porous current collector layers CC of the electrode is preferably in the form of a grid. Thus, this allows obtaining an optimum electrode active volume while guaranteeing a minimum weight.

According to the invention, the porous current collector layers CC are composed by or comprise materials whose electronic conductivity is good (i.e. $\geq 10^2$ S·cm$^{-1}$). Thus, according to a preferred embodiment, the porous current collector layers CC, whether identical or different, consist of layers made of a conductive material.

The porous current collector layers CC may be selected from non-metallic porous layers (such as conductive carbon felt) or from metallic porous layers.

When they consist of metallic layers, the porous current collector layers CC, whether identical or different, consist in particular of layers of metallic conductive material such as a carbon fabric further comprising a metal M selected from aluminium, copper, nickel, zinc, tin and one of the mixtures thereof.

As example of different porous current collector layers CC, the electrode may comprise porous current collector layers CC$^1$ comprising (or consisting of) a metal M$^1$ and porous current collector layers CC$^{1'}$ comprising (or consisting of) a metal M$^{1'}$, M$^1$ and M$^{1'}$ being different and having the same definition as M.

The thicknesses of the porous current collector layers CC may be identical or different.

The entire surface of the porous current collector layers CC may be covered by a metallic protective layer.

In particular, the metallic protective layers, whether identical or different, comprise (or consist of) a metal M' selected from lead, silver, tin, and one of the mixtures thereof.

The metallic protective layers allow protecting the porous current collector layers CC from a possible corrosion, in particular when the electrolyte of the device is a basic aqueous electrolyte. According to the invention, each of the electrode material layers ME comprises at least one electrode active material, and in general a polymer binder and optionally an electronic conductivity-imparting agent.

When the electrode is intended to be a positive electrode, the active material is a positive electrode active material and when the electrode is intended to be a negative electrode, the active material is a negative electrode active material.

In general, the electrode material layers ME comprise the same electrode active material, in particular they have identical compositions.

According to a particular and preferred embodiment of the invention, the electrode is a zinc-based negative electrode. According to this embodiment, the active material of the electrode material layers ME is preferably selected from calcium zincate or a mixture of zinc oxide and calcium hydroxide or a mixture of zinc and calcium hydroxide.

According to the invention, the polymer binder of the electrode material layer ME may be selected from polymer binders known to those skilled in the art, in particular polyvinylidene fluoride (PVDF), carboxymethyl cellulose (CMC), polytetrafluoroethylene (PTFE), polyvinyl alcohol (PVOH), polyacrylic acid (PAA), polyethylene glycol (PEO). In particular, the polymer binder is intended to maintain a good cohesion of the constituent materials of the electrode material layer ME, and possibly a good adhesion with the current collector CC.

Also, according to the invention, an electronic conductivity-imparting agent may be selected from electronic conductors known to those skilled in the art, in particular carbon compounds in any forms thereof (nanotubes, grapheme oxide, submicron powders), conductive ceramics such as titanium nitride or other metallic oxides (silver oxide, bismuth oxide . . . ). In a known manner, this electronic conductivity-conferring agent is intended to create a percolating network with an electronic conductivity, in particular by transfer of electrons within the electrode material layer. Their use also results in lowering the inner resistance of the electrode material layer ME.

As example, the electronic conductivity of the electronic conductivity-imparting agent is higher than or equal to $10^2$ S·cm$^{-1}$ and preferably higher than or equal to $10^4$ S·cm$^{-1}$.

The polymer binder, the electronic conductivity-imparting agent, are well known to those skilled in the art and will not be detailed further hereinafter.

Preferably, each of the electrode material layers ME has a thickness varying from 50 μm to about 1 mm, and preferably varying from 100 μm to about 500 μm.

Indeed, the Applicant has discovered that the inner resistance of the electrode varies increasingly with the thickness of the electrode material layers ME. Thus, the thinner the ME layer and the lower will be the inner resistance, which leads to a better performance of the electrode.

In general, the thicknesses of the electrode material layers ME may be identical or different, and are preferably identical.

Figure 1:
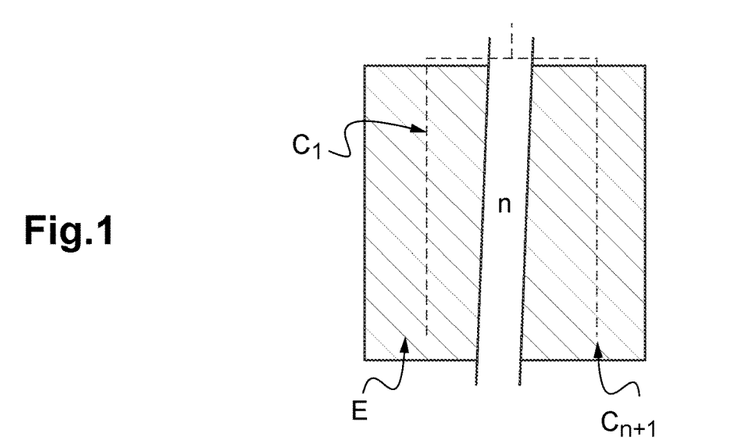
FIG. 1 is a diagram of an electrode according to one variant, wherein the electrode is in the form of an assembly of successive layers having the following structure: ME-[CC-ME]$_n$ where "ME" (hatched) and "CC" (dotted) are as defined hereinabove and where "C$_n$" corresponds the collector "n", n corresponds to the number of repetitions of current collector layer(s) CC and of electrode material layer(s) ME and E is the electrode.

Different variants of the invention will now be described hereinbelow with reference to FIGS. 1 to 3. According to a first variant represented in FIG. 1, said electrode is in the form of an assembly of successive layers where each of the two outer layers of the electrode is an electrode material layer ME, having the following structure:

ME-[CC-ME]$_n$ ou [ME-CC-ME]$_n$ wherein ME is an electrode material layer, CC is a porous current collector layer, "n" is a repeat pattern which is comprised between 3≤n≤200, preferably between 3≤n≤100, and typically between 3≤n≤20.

Thus, according to this variant, each of the "outer layers" of the electrode is formed by an electrode material layer ME and the current collector layer CC is interposed between two electrode material layers.

According to the invention, by "outer layer", it should be understood a layer that does not form an inner layer of the electrode and which is the surface layer of the electrode. In particular, according to this first variant, an "outer layer" does not form an electrode material layer ME interposed between two porous current collector layers CC. As it will be seen hereinafter, the outer layer(s) may be formed by an electrode material layer ME, by a mechanical holding and separation layer MMS.

The outer layer(s) of the electrode that consist(s) of electrode material layer(s) ME is/are preferably intended to be in contact with the electrolyte of the device.

In particular, the number of current collector layers CC depends on the overall thickness of the electrode and on the choice of the thickness of the electrode material layers ME.

In general, according to this variant, the thickness of the electrode preferably varies from 4 to 10 mm, in particular from 4 to 8 mm and typically from 4 to 6 mm.

Similarly, according to this first variant, each of the electrode material layers ME has a thickness varying from 50 μm to about 1 mm, and preferably from 100 μm to about 500 μm.

As example, according to this variant,
an electrode having a thickness ranging from 4 mm (not included) to 1 cm may have up to 200 CC layers and 201 ME layers, the ME layers having a thickness ranging from 50 µm to 1 mm, preferably from 100 µm to 500 µm;
an electrode having a thickness ranging from 4 mm to 8 mm may have up to 160 CC layers and 161 ME layers, the ME layers having a thickness ranging from 50 µm to 1 mm, preferably from 100 µm to 500 µm; and
an electrode having a thickness ranging from 4 mm to 6 mm may have up to 120 CC layers and 121 ME layers, the ME layers having a thickness ranging from 50 µm to 1 mm, preferably from 100 µm to 500 µm.

Figure 2:
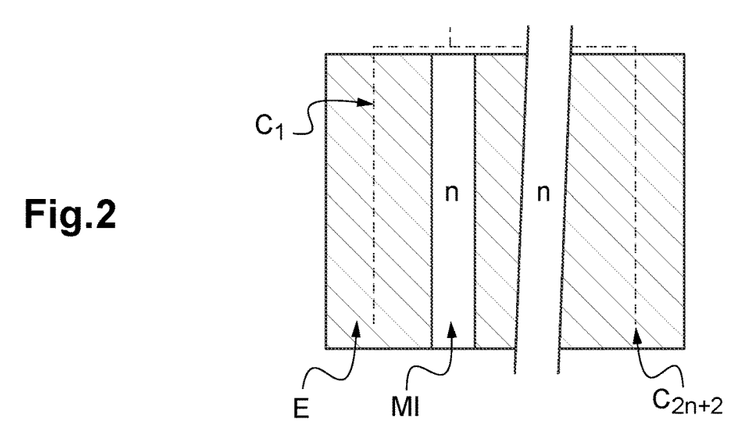
FIG. 2 is a diagram of an electrode according to another variant, wherein the electrode is in the form of an assembly of successive layers having the following structure: ME-CC-[ME-MI-ME-CC]$_n$-ME where "ME" (hatched), "CC" (dotted), "E", "C$_n$" and "n" are as defined before and where "MI" corresponds to an impregnation layer.

According to a second variant represented in FIG. 2, said electrode is in the form of an assembly of successive layers where at least one of said inner layers of the electrode according to the invention is an impregnation layer MI comprising an inert porous material (namely not electrically-conductive), provided that when the electrode comprises two or more impregnation layers MI, these are at least spaced apart by 100 µm to 2 mm, preferably by 200 µm to 1 mm, in particular by 300 µm to 800 µm and ideally by 500 µm.

Indeed, in order to improve the circulation of the electrolyte within the electrode when the latter is included in an energy storage device, the electrode according to the invention may comprise within its inner layers, one or several impregnation layers MI made of an inert porous material (namely not electrically-conductive). In particular, these layers MI allow or are configured so as to enable the free circulation of the electrolyte thanks to a sufficient open porosity. Nevertheless, this inert impregnation material being electrochemically inactive, it necessarily reduces the energy density of the electrode. In order to minimise its negative impact on the energy density, it is generally necessary to use less than 5 weight % of MI with respect to the total weight of active material. Without being bound by any theory, it seems that, thanks to its mechanical properties, this MI layer would also allow conferring better mechanical holding properties on the electrode.

The inert porous material(s) that could form a layer MI may be selected from polymer materials having good resistance properties with respect to the electrolyte. Also, the inert porous materials(s) that could form a layer MI may be selected from polymer materials having good hydrophilic properties, or having undergone a surface treatment making them hydrophilic (namely, from hydrophobic into hydrophilic).

In general, the inert porous material(s) that could form a layer MI have an open porosity ranging from 40% to 70%, preferably from 50% to 60% and typically from 53% to 55% measured according to conventional methods applicable in the field of porous materials, separators and other thin films.

In the context of the invention, a porosity located between 40% and 70% comprises the following values or any interval between these values: 40; 41; 42; 43; 44; 45; 46; 47; 48; 49; 50; 51; 52; 53; 54; 55; 56; 57; 58; 59; 60; 61; 62; 63; 64; 65; 66; 67; 68; 69; 70.

As example, the material that could form the layer MI may correspond to the porous products commercialised by the company Freudenberg.

In general, the inert porous material(s) that could form a layer MI meet(s) the compliance standards EN 29073-03 in terms of aqueous electrolyte absorption consisting of 30% of potassium hydroxide. In particular, each MI layer has a thickness measured according to the standard ISO 9073-2 ranging from 0.070 mm to 0.0130 mm, in particular from 0.090 mm to 0.120 mm and typically from 0.100 mm to 0.110 mm.

As example, the MI layer(s) may be formed by a mesh-type fabric made of polytetrafluoroethylene (PTFE), polypropylene (PP), polyolefin (PO) or any other equivalent material.

Preferably, according to this second variant, each of the two outer layers of the electrode is an electrode material layer ME and said electrode is in the form of an assembly of successive layers having the following structure:

ME-CC-[ME-MI-ME-CC]$_n$-ME wherein ME is an electrode material layer, CC is a porous current collector layer, MI is an impregnation layer, "n" is a repeat pattern which is comprised between 2≤n≤200, preferably between 2≤n≤100, and typically between 2≤n≤20. Thus, according to this variant, each of the two "outer layers" of the electrode is formed by an electrode material layer ME, as is also the case for the first variant. In particular, according to the example of a structure hereinabove, the layer MI is alternately distributed according to the pattern:

ME-CC-[ME-MI-ME-CC]$_n$-ME.

In general, the number of layers MI depends on the total thickness of the electrode.

As example, according to this variant,
an electrode having a thickness ranging from 4 mm (not included) to 1 cm may have 5 to 200 CC layers and from 6 to 201 ME layers, and from 1 to 16 MI layers, the ME layers having a thickness ranging from 50 µm to 1 mm, preferably from 100 µm to 500 µm;
an electrode having a thickness ranging from 4 mm to 8 mm may have 5 to 160 CC layers and from 6 to 161 ME layers, and from 1 to 80 MI layers, the ME layers having a thickness ranging from 50 µm to 1 mm, preferably from 100 µm to 500 µm; and
an electrode having a thickness ranging from 4 mm to 6 mm may have 5 to 120 CC layers and from 5 to 121 ME layers, and from 1 to 60 MI layers, the ME layers having a thickness ranging from 50 µm to 1 mm, preferably from 100 µm to 500 µm.

Figure 3:
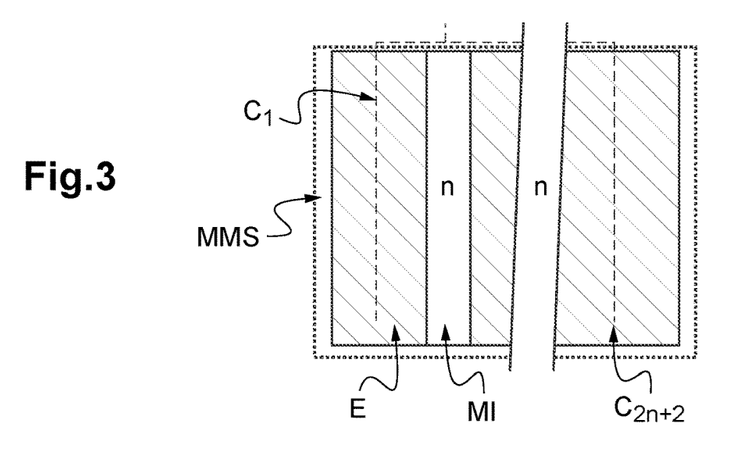
FIG. 3 is a diagram of an electrode according to another variant, wherein the electrode is in the form of an assembly of successive layers having the following structure: MMS-ME-CC-[ME-MI-ME-CC]$_n$-ME-MMS where "ME" (hatched), "CC" (dotted), "E", "MI", "C$_n$" and "n" are as defined before and where "MMS" corresponds to a mechanical holding and separation layer.

According to a third variant represented in FIG. 3, the electrode may be characterised in that at least one of the two outer layers, preferably both layers, consist(s) of a mechanical holding and separation layer MMS comprising at least one inert material capable of or configured to allow the circulation of the electrolyte and the ions thereof. Indeed, the layer MMS is adapted so as to make the electrolyte of the energy storage device circulate and could therefore be considered as "ion-conductive" because it is adapted to let the ions of the electrolyte circulate, either physically by its porosity, or by other mechanism, such as by diffusion/migration, if the layer is uniform and non-porous. However, it is not electrically-conductive because it does not conduct electrons.

The layer MMS may comprise, or consist of, at least one material that could be identical or different to the inert porous material of the impregnation layer MI, namely comprise, or consist of:
porous materials, such as a mesh of PP, PTFE or any other equivalent porous material; and/or
non-porous materials, such as polyvinyl alcohol (PVOH), Nafion®, ion-exchange membranes of any other ion conductive material.

In general, the MMS layer has a porosity lower than or equal to 20%, preferably lower than or equal to 10% and typically lower than or equal to 5%.

In the context of the invention, a porosity lower than or equal to 20% comprises the following values or any interval between these values: 0; 1; 2; 3; 4; 5; 6; 7; 8; 9; 10; 11; 12; 13; 14; 15; 16; 17; 18; 19; 20.

As example, the layer MMS may be prepared by a physical deposition such as immersion, spray, brush application or any other technique allowing applying the constituent material of the layer MMS in its dissolved form in a suitable solvent or pure.

In particular, this variant may be combined with the first or second variant, namely the layers MMS may overlay the electrode material layers ME forming the outer layers of these embodiments and be combined, or not, with one or several layer(s) MI.

Preferably, according to this second variant, said electrode is in the form of an assembly of successive layers having the following structure:

MMS-ME-[CC-ME]$_n$-MMS or

MMS-ME-CC-[ME-MI-ME-CC]$_n$-ME-MMS wherein ME is an electrode material layer, CC is a porous current collector layer, MI is an impregnation layer, MMS is a mechanical holding and separation layer, "n" is a repeat pattern which is comprised between 2≤n≤200, preferably between 2≤n≤100, and typically between 2≤n≤20.

According to this third variant, the MMS layer wrap the entire electrode thereby allowing separating the electrode (for example the negative electrode) from the second electrode of the energy storage device (for example the positive electrode). Another function of these two outer MMS layers is to improve the overall mechanical holding of the electrode.

In general, each MMS layer has a thickness ranging from 20 µm to 150 µm, in particular from 20 to 70 µm and typically from 25 to 60 µm.

According to the invention, the electrode may be a positive or negative electrode.

Preferably, the electrode is a negative electrode, preferably zinc-based.

The electrode in accordance with the present invention may be easily manufactured by any type of processes allowing applying an electrode material layer in the form of an ink or of a paste comprising at least one positive or negative electrode active material, at least one solvent, possibly at least one polymer binder and possibly an electronic conductivity-imparting agent, over a porous current collector layer CC. Among such methods, mention may be made in particular of coating, dipping, spraying, printing, calendering, etc.

The invention also relates to an energy storage recharging device comprising at least: a positive electrode, a negative electrode and an electrolyte, said device being characterised in that at least the positive electrode or the negative electrode, preferably the negative electrode, is an electrode as defined hereinabove.

Of course, the above-described features are herein replicated in their entirety to characterise the energy storage recharging device according to the invention.

According to the invention, by "electrolyte", it should be understood any liquid or solid substance enabling the passage of electric current by ion displacement.

According to a preferred embodiment of the invention, the electrolyte is in direct contact with the electrode as defined hereinabove through the outer layer which may consist of an electrode material layer ME or a layer MMS of said electrode.

In particular, the electrolyte of the device is not in direct contact with the porous current collector layers CC of the electrode as described hereinabove. Thus, this allows avoiding, or at least reducing, the formation of dendrites, and avoiding a short-circuit within the device. Indeed, the porous current collector layers CC being very conductive, their direct contact with the electrolyte could cause, as of the first charging, an unsaturation of the electrolyte and an increase in the thickness of the electrode, inducing the formation of dendrites, the perforation of the separator and possibly a short-circuit after 1 or 2 cycle(s).

The device may further comprise at least one glassy carbon element in direct contact with the other one of the two outer layers of the electrodes, and in particular with the outer layer intended to ensure the electrical connection of the electrode with the external circuit. Consequently, the electrical connection of the electrode with the external circuit is done through said element. Thus, this allows avoiding a possible contact between said other one of the two outer layers of the electrode and the electrolyte within the device.

In particular, the device may be selected from an alkaline accumulator, a lithium-ion battery, a lead battery, a nickel-metal hydride or Ni-MH battery and a supercapacitor.

Conventionally, and depending on the device type, the electrolyte may be liquid, gelled or solid. According to a preferred embodiment of the invention, the device is an alkaline accumulator selected from a battery whose negative electrode is zinc-based, such as a zinc-air battery and a zinc-nickel battery.

The alkaline accumulator is defined as being a rechargeable energy storage device comprising: at least one positive electrode, at least one negative electrode, a liquid electrolyte, and one or several porous separator(s).

In the case where the alkaline accumulator consists of a zinc-nickel battery, the negative electrode of the device is a zinc-based electrode as defined hereinabove.

In this embodiment, the positive electrode may consist of a nickel-based electrode, in particular comprising as an active material, nickel oxide (III) (NiOOH), nickel hydroxide (II) (Ni(OH)$_2$), or one of the mixtures thereof.

The porous separator may be an electronically non-conductive porous material, in general a polyolefin-based polymer material (for example, polyethylene) or of fibres (for example, glass fibres or wood fibres, cellulosic fibres).

The electrode in accordance with the first object of the invention may comprise (upper, lower or circular) edges intended to ensure the electrical connection with the external circuit. These edges may then be covered with an insulating material, such as polytetrafluoroethylene (PTFE). Thus, this allows isolating, within the device, the portions of the electrode that are not intended to be in contact with the electrolyte.

The device in accordance with the invention can be easily assembled by any technique known to those skilled in the art.

Another object of the present invention is the use of an electrode as defined hereinabove, to improve the capacity of a rechargeable energy storage device.

Of course, the features described hereinabove for the electrode or the energy storage recharging device are herein replicated in their entirety to characterise the use of the electrode according to the invention.)

F.° Examples

The description of the tests hereinbelow is given as a merely illustrative and non-limiting example. In particular, Table 1 hereinbelow illustrates the different tests carried out by the Applicant.

TABLE 1

| Electrode | $ME\text{-}[CC\text{-}ME]_n$ ou $[ME\text{-}CC\text{-}ME]_n$ | $ME\text{-}CC\text{-}[ME\text{-}MI\text{-}ME\text{-}CC]_n\text{-}ME$ | $MMS\text{-}ME\text{-}[CC\text{-}ME]_n\text{-}MMS$ | $MMS\text{-}ME\text{-}CC\text{-}[ME\text{-}MI\text{-}ME\text{-}CC]_n\text{-}ME\text{-}MMS$ |
|---|---|---|---|---|
| Thickness 4.5 mm | Example 1 n = 7 | — | — | — |
| Thickness 8 mm | Example 2 n = 8 | Example 3 n = 7 | Example 4 n = 8 (thickness, MMS layers excluded) | Example 5 n = 7 |

1—Raw Materials

As regards the tests, the starting raw materials are summarised in Table 2 hereinbelow.

TABLE 2

| Compounds | Manufacturer | Characteristics |
|---|---|---|
| Polyvinyl alcohol | Kuraray poval | Molar mass Mw = 195 000 g/mol |
| Titanium nitride | EASYL | Purity of 99% |
| Bismuth oxide | Alfa Aesar | Purity of 99%, |
| Zinc oxide (ZnO) | a.m.p.e.r.e. industrie | Purity of 99.9%, |
| Calcium zincate | EASYL | Purity of 99%, |
| Polytetrafluoroethylene (PTFE) | ROTH | Seal Tape Grade L |
| Non-woven separator made of a polyolefin | Freudenberg | FS 2203-10 |
| Polypropylene membrane | Celgard | Celgard ® 3401 |
| Porous current collector layer CC in the form of a copper grid | Gantois | Diameters of the copper wires amounting to 50 μm, nominal opening 121 μm, ref CUA1 Annealed |

Unless specified otherwise, all materials have been used as received from the manufacturers.

2—General Procedure for Implementing the Electrodes According to the Invention In order to prepare the different electrodes according to the invention (Examples 1 to 5), a prior step is carried out. This step consists in preparing an aqueous ink intended to form the different electrode material layers ME.

3—Example 1: Preparation of an Electrode in Accordance with the Invention According to the First Variant ($ME\text{-}[CC\text{-}ME]_7$ Assembly)

An aqueous ink, containing 45% of a solid matter, is prepared according to the proportions summarised in Table 3 hereinbelow:

TABLE 3

| Compounds | Mass content in % |
|---|---|
| Calcium zincate | 61.6% |
| ZnO | 15.4% |
| TiN | 10% |
| $Bi_2O_3$ | 5% |
| PTFE (polytetrafluoroethylene) | 4% |
| PVA (polyvinyl alcohol) | 4% |

This aqueous ink represents the mixture that constitutes the electrode material ME. The homogeneous mixture is applied in the form of a uniform layer deposited at the surface of an anti-adhesive support using a coating scraper whose height is adjustable with a 50 μm accuracy. For this Example 1, the first coating height is set at 1500 μm of ink.

Once deposited, a current collector is applied at the surface of this first layer, in the form of a copper grid CC, cut beforehand according to the desired dimensions for the final surface of the electrode (100 cm$^2$).

In this first coating layer with a current collector, a second ink layer is applied over which a second current collector is applied in the form of a copper grid, positioned strictly parallel to the previous current collector CC. The process is repeated until reaching the thickness and the number of desired layers. For this Example 1, this action is repeated 7 times. The coating heights, namely the deposited ink height per layer and the cumulated ink layer, are listed in the following Table 4:

TABLE 4

| $h_{ink}$ (mm) | cumulated $h_{ink}$ (mm) |
|---|---|
| 1.5 | 1.5 |
| 0.7 | 2.2 |
| 0.7 | 2.9 |
| 0.7 | 3.6 |
| 0.7 | 4.3 |
| 0.7 | 5 |
| 0.7 | 5.7 |
| 1.5 | 7.2 |

Example 1 is particular in that it has the first and last coating layers 1500 μm thick and the inner coating layers 700 μm thick. Thus, this Example 1 is in the form of an assembly of successive layers having the following structure:

$ME\text{-}[CC\text{-}ME]_7$

The wet assembly of the electrode material (namely the ink) and of the current collectors CC is dried in a thermostatically-controlled enclosure at 35° C. for 24 to 48 h. Once dried, the blank electrode is retrieved and then immersed for 2 h in deionised water at ambient temperature. The PVA and PTFE maintaining their bonding properties, the blank electrode does not disintegrate and remains in the form of one single block. Once hydrated, the electrode of Example 1 is cautiously cut to the desired dimension (100 cm$^2$) so that no current collector CC projects from the edges of the electrode. An 8-ton press is applied on the wet electrode. Afterwards, the electrode is dried under stresses, in order to avoid delamination of the layers by contraction of the polymer material. To proceed with drying, a vacuum enclosure is used for this Example 1.

Once dried, a measurement of the weight of the electrode allows determining, by subtraction of the copper and of the other inactive materials, the capacity of the electrode. The electrode of Example 1 is an electrode with a 4.5 mm thickness and with a 20.0 Ah capacity for a surface area of 100 cm$^2$.

A nickel or nickel-plated steel BUS is applied at the electrode head by point welding in order to group together all current collectors, into one single electrode head. Afterwards, the electrode head is covered by a sealing ribbon made of PTFE.

The electrode of this Example 1 is subjected to an impregnation test in order to determine the time the latter requires before being able to start a possible electrochemical test in the context of use of this electrode type in a real system.

Figure 4:
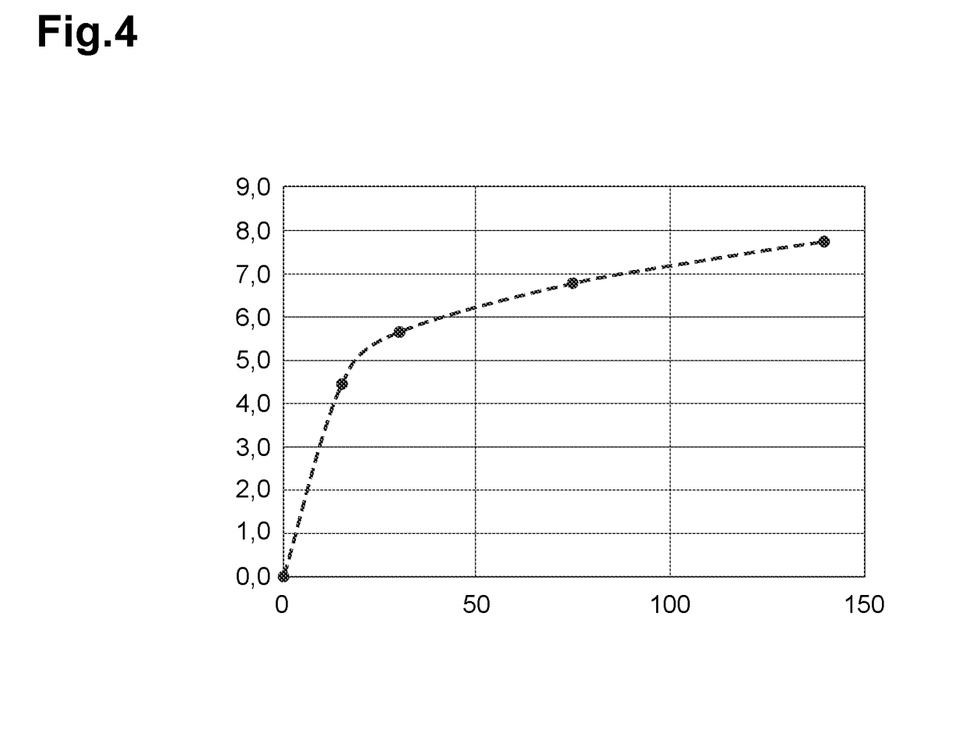
FIG. 4 is a graph representing the variation of the mass of the electrode according to Example 1 in accordance with the invention (mass in %) as a function of duration of immersion in deionised water (in minutes)

The impregnation is performed by complete immersion of the electrode in deionised water and the result obtained for this electrode is shown in FIG. 4.

As shown in this FIG. 4, the electrode according to this Example 1 has a high impregnation rate and therefore an excellent aqueous electrolyte assimilation capacity.

4—Example 2: Preparation of an Electrode in Accordance with the Invention According to the First Variant ([ME-CC-ME]$_8$ Assembly)

An aqueous ink, containing 45% of a solid matter, is prepared according to the proportions summarised in Table 3 hereinabove (Example 1).

This aqueous ink represents the mixture that makes the electrode material ME. The homogeneous mixture is applied in the form of a uniform layer deposited at the surface of an anti-adhesive support using a coating scraper whose height is adjustable with a 50 µm accuracy. For this Example 2, one single 2000 µm coating is applied until complete depletion of the ink so as to obtain several wet coatings. Afterwards, these wet coatings are dried in a thermostatically-controlled enclosure at 35° C. for 24 h. Afterwards, the dry raw coatings obtained in this manner are impregnated again with deionised water, and then cut to the desired dimensions so as to obtain wet coatings. For this Example 2, the coatings are cut according to the dimensions 60×40 mm. In order to form the final electrode, the wet coatings are assembled with current collector layers CC, and then subjected to a 2 T press.

The electrode of Example 2 is assembled according to the pattern:

[ME-CC-ME]$_8$

This manufacturing method leads to electrodes whose layers tend to delaminate. The PVA binder being easily soluble in water whose temperature is higher than 90° C., a precaution has been taken and has consisted in immersing only the edges of the electrode of Example 2, very quickly (10 sec at most), so these offer a sufficient mechanical strength for the impregnation test.

Afterwards, the electrode is dried under stresses, in order to avoid delamination of the layers by contraction of the polymer material. To proceed with drying, a vacuum enclosure is used for Example 2.

Once dried, a measurement of the weight of the electrode allows determining, by subtraction of the copper and of the other inactive materials, the capacity of the electrode. The electrode of Example 2 is an electrode with an 8.0 mm thickness and with a 12 Ah capacity for a surface area of 27 cm$^2$.

A nickel or nickel-plated steel BUS is applied at the electrode head by point welding in order to group together all current collectors, into one single electrode head. Afterwards, the electrode head is covered by a sealing ribbon made of PTFE.

Figure 5:
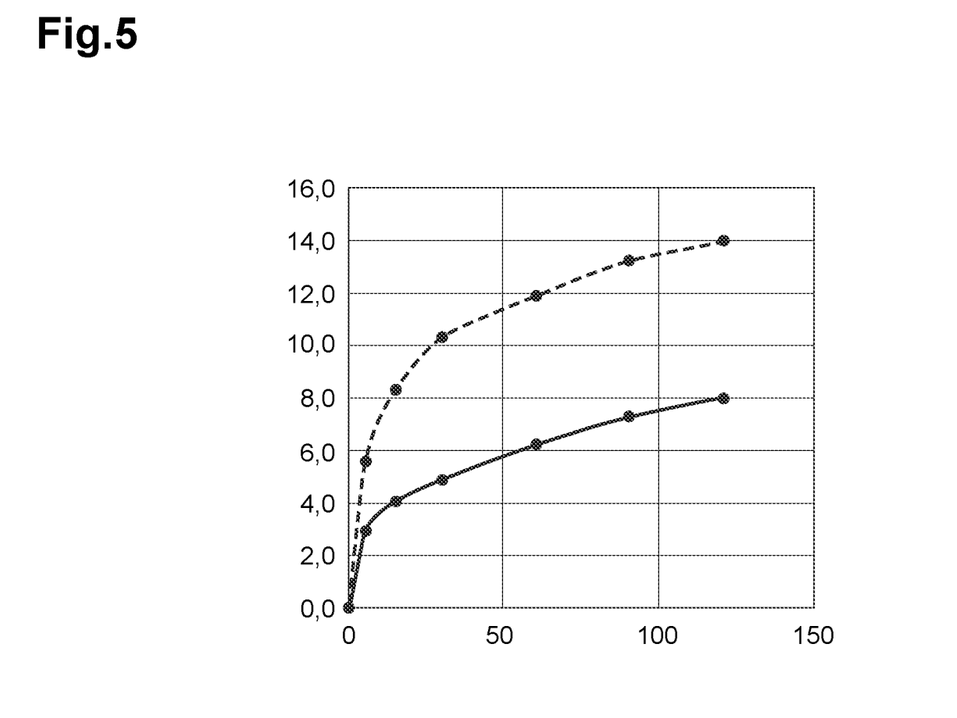
FIG. 5 is a graph representing in "dotted line" the variation of the mass of the electrode (mass in %) according to Example 2 (without the impregnation material layer MI) as a function of duration of immersion thereof in deionised water (in minutes); and in "continuous line" the variation of the mass of the electrode (mass in %) according to Example 3 (with the impregnation material layer MI) in accordance with the invention as a function of duration of immersion in deionised water (in minutes).

The electrode of Example 2 is subjected to an impregnation test in order to determine the time the latter requires before being able to start a possible electrochemical test in the context of use of this electrode type in a real system. The impregnation is performed by complete immersion of the electrode in deionised water and the result obtained for this electrode is shown in FIG. 5.

5—Example 3: Preparation of an Electrode in Accordance with the Invention According to the Second Variant (ME-CC-[ME-MI-ME-CC]$_7$-ME Assembly)

An aqueous ink, containing 45% of a solid matter, is prepared according to the proportions summarised in Table 3 hereinabove (Example 1).

This aqueous ink represents the mixture that makes the electrode material ME. The homogeneous mixture is applied in the form of a uniform layer deposited at the surface of an anti-adhesive support using a coating scraper whose height is adjustable with a 50 µm accuracy. For the example, one single 2000 µm coating is applied until complete depletion of the ink. The wet coatings are dried in a thermostatically-controlled enclosure at 35° C. for 24 h. Afterwards, the dry raw coatings are impregnated again with deionised water, and then cut to the desired dimensions. For this Example 3, the coatings are cut according to the dimensions 60×40 mm. In order to form the final electrode, the wet coatings are assembled with current collector layers as well as with impregnation material layers before being subjected to a 2 T press.

The electrode of Example 3 is assembled according to the pattern:

ME-CC-[ME-MI-ME-CC]$_7$-ME

This manufacturing method leads to electrodes whose layers tend to delaminate. The PVA binder being easily soluble in water whose temperature is higher than 90° C., a precaution has been taken and has consisted in immersing only the edges of the electrode of Example 3, very quickly (10 sec at most), so these offer a sufficient mechanical strength for the impregnation test. Afterwards, the electrode is dried under stresses, in order to avoid delamination of the layers by contraction of the polymer material. To proceed with drying, a vacuum enclosure is used for Example 3.

Once dried, a measurement of the weight of the electrode allows determining, by subtraction of the copper and of the other inactive materials, the capacity of the electrode. The electrode of Example 3 is an electrode with an 8.0 mm thickness and with a 12 Ah capacity for a surface area of 27 cm$^2$. A nickel or nickel-plated steel BUS is applied at the electrode head by point welding in order to group together all current collectors, into one single electrode head. Afterwards, the electrode head is covered by a sealing ribbon made of PTFE.

The electrode of Example 3 is subjected to an impregnation test in order to determine the time the latter requires before being able to start a possible electrochemical test in the context of use of this electrode type in a real system. The impregnation is performed by complete immersion of the electrode in deionised water and the result obtained for this electrode is shown in FIG. 5.

This FIG. 5 also shows that the electrodes according to Examples 2 and 3 have an excellent capacity (high impregnation rate), but that this is improved when the electrode comprises impregnation layers MI (Example 3).

6—Example 4: Preparation of an Electrode in Accordance with the Invention According to the Third Variant (MMS-ME-[CC-ME]$_8$-MMS Assembly)

An aqueous ink, containing 45% of a solid matter, is prepared according to the proportions summarised in Table 3 hereinabove (Example 1).

This aqueous ink represents the mixture that makes the electrode material ME. The homogeneous mixture is applied in the form of a uniform layer deposited at the surface of an anti-adhesive support using a coating scraper whose height is adjustable with a 50 µm accuracy. For this Example 4, one single 2000 µm coating is applied until complete depletion of the ink. The wet coatings are dried in a thermostatically-controlled enclosure at 35° C. for 24 h. Afterwards, the dry raw coatings are impregnated again with deionised water, and then cut to the desired dimensions. For this Example 4, the coatings are cut according to the dimensions 60×40 mm. In order to form the final electrode, the wet coatings are assembled with current collector layers and then subjected to a 2 T press. Afterwards, the assembly is dried under stresses, in order to avoid delamination of the layers by contraction of the polymer material. To proceed with drying, a vacuum enclosure is used for this Example 4.

Once dried, a measurement of the weight of the assembly allows determining, by subtraction of the copper and of the other inactive materials, the capacity of the electrode. The electrode of Example 4 is an electrode with an 8.0 mm thickness and with a 12 Ah capacity for a surface area of 27 cm$^2$. In order to confer a sufficient mechanical holding and avoid delamination of the layers, the assembly is then immersed in a PVA solution before being dried in a vertical position and at ambient temperature for 1 night.

Hence, at this final stage, the electrode is assembled according to the pattern:

MMS-ME-[CC-ME]$_8$-MMS

In the context of Example 4, the PVA solution is at a concentration of 10% weight. A nickel or nickel-plated steel BUS is applied at the electrode head by point welding in order to group together all current collectors, into one single electrode head. Afterwards, the electrode head is covered by a sealing ribbon made of PTFE.

7—Example 5: Preparation of an Electrode in Accordance with the Invention According to the Third Variant (MMS-ME-CC-[ME-MI-ME-CC]$_7$-ME-MMS Assembly)

An aqueous ink, containing 45% of a solid matter, is prepared according to the proportions summarised in Table 3 hereinabove (Example 1).

This aqueous ink represents the mixture that makes the electrode material ME. The homogeneous mixture is applied in the form of a uniform layer deposited at the surface of an anti-adhesive support using a coating scraper whose height is adjustable with a 50 µm accuracy. For this Example 5, one single 2000 µm coating is applied until complete depletion of the ink. The wet coatings are dried in a thermostatically-controlled enclosure at 35° C. for 24 h. Afterwards, the dry raw coatings are impregnated again with deionised water, and then cut to the desired dimensions. For this Example 5, the coatings are cut according to the dimensions 60×40 mm. In order to form the final electrode, the wet coatings are assembled with current collector layers as well as with impregnation material layers before being subjected to a 2 T press. Afterwards, the assembly is dried under stresses, in order to avoid delamination of the layers by contraction of the polymer material. To proceed with drying, a vacuum enclosure is used for this Example 5. Once dried, a measurement of the weight of the assembly allows determining, by subtraction of the copper and of the other inactive materials, the capacity of the electrode. The electrode of this Example 5 is an electrode with an 8.0 mm thickness and with a 12 Ah capacity for a surface area of 27 cm$^2$. In order to confer a sufficient mechanical holding and avoid delamination of the layers, the assembly is then immersed in a PVA solution before being dried in a vertical position and at ambient temperature for 1 night.

Hence, at this final stage, the electrode is assembled according to the pattern:

MMS-ME-CC-[ME-MI-ME-CC]$_7$-ME-MMS

A nickel or nickel-plated steel BUS is applied at the electrode head by point welding in order to group together all current collectors, into one single electrode head. Afterwards, the electrode head is covered by a sealing ribbon made of PTFE.

Of course, various modifications could be made to the invention in the context of the appended claims.

The invention claimed is:

1. An electrode for a rechargeable energy storage device, the electrode comprising:
a plurality of inner layers interposed between two outer layers, said inner layers comprising a plurality of electrode material layers ME composed of at least one electrode active material and a plurality of porous current collector layers CC composed of electrically conductive material whose electronic conductivity is greater than or equal to $10^2$ S·cm$^{-1}$, said layers of electrode material ME and current collector CC being alternated,
wherein said outer layers do not consist of said porous current collector layers CC, and
wherein said electrode has a total thickness more than 4 mm.

2. The electrode according to claim 1, wherein the electrode has a total thickness range from more than 4 mm to 10 mm.

3. The electrode according to claim 1, wherein the electrode has a total thickness range from more than 4 mm to 6 mm.

4. The electrode according to claim 1, wherein at least one portion or each of the porous current collector layers CC is one of a grid, a perforated sheet, a felt, a mesh, a fabric, and a foam.

5. The electrode according to claim 1, wherein the porous current collector layers CC are identical or different and consist of layers of electrically conductive material.

6. The electrode according to claim 1, wherein each of the electrode material layers ME comprises a polymer binder.

7. The electrode according to claim 1, wherein each of the electrode material layers ME has a thickness ranging from 50 µm to 1 mm.

8. The electrode according to claim 7, wherein each of the electrode material layers ME has a thickness ranging from 100 µm to 500 µm.

9. The electrode according to claim 1, wherein said electrode is in the form of an assembly of successive layers where each of the two outer layers of the electrode is an electrode material layer ME, having the following structure:

ME-[CC-ME]$_n$ or [ME-CC-ME]$_n$ wherein ME is an electrode material layer, CC is a porous current collector layer, n is a repeat pattern which is comprised between $3 \leq n \leq 200$.

10. The electrode according to claim 9, wherein n is comprised between $3 \leq n \leq 100$.

11. The electrode according to claim 1, wherein said electrode is in the form of an assembly of successive layers where at least one of said inner layers is an impregnation layer MI comprising an electrically inert porous material, provided that when the electrode comprises two or more impregnation layers, the two or more impregnation layers are at least spaced apart by 100 µm to 4 mm.

12. The electrode according to claim 11, wherein the two or more impregnation layers are at least spaced apart by 300 µm to 3 mm.

13. The electrode according to claim 11, wherein the two or more impregnation layers are at least spaced apart by 500 µm to 2 mm.

14. The electrode according to claim 11, wherein each of the two outer layers of the electrode is an electrode material layer ME and said electrode is in the form of an assembly of successive layers having the following structure:

ME-CC-[ME-MI-ME-CC]$_n$-ME wherein ME is an electrode material layer, CC is a porous current collector layer, MI is an impregnation layer, n is a repeat pattern which is comprised between $2 \leq n \leq 200$.

15. The electrode according to claim 14, wherein n is comprised between $2 \leq n \leq 100$.

16. The electrode according to claim 1, wherein at least one of the two outer layers is a mechanical holding and separation layer MMS comprising at least one electrically inert material capable of or configured to allow the circulation of an electrolyte and ions thereof.

17. The electrode according to claim 16, wherein said electrode is in the form of an assembly of successive layers having the following structure:

MMS-[ME-CC-ME]$_n$-MMS or

MMS-ME-CC-[ME-MI-ME-CC]$_n$-ME-MMS wherein ME is an electrode material layer, CC is a porous current collector layer, MI is an impregnation layer, MMS is a mechanical holding and separation layer, n is a repeat pattern which is comprised between $2 \leq n \leq 200$.

18. The electrode according to claim 1, wherein the electrode is a positive or negative electrode.

19. An energy storage recharging device comprising at least: one positive electrode, a negative electrode, and an electrolyte, wherein the positive electrode or the negative electrode is the electrode as defined in claim 1.

20. The device according to claim 19, which is an alkaline accumulator selected from a zinc-air battery and a zinc-nickel battery.

* * * * *